US009460083B2

United States Patent
Fink et al.

(10) Patent No.: US 9,460,083 B2
(45) Date of Patent: Oct. 4, 2016

(54) INTERACTIVE DASHBOARD BASED ON REAL-TIME SENTIMENT ANALYSIS FOR SYNCHRONOUS COMMUNICATION

(71) Applicant: International Business Machines Corporation, Armonk, NY (US)

(72) Inventors: Patrick W. Fink, Charlotte, NC (US); Kristin E. McNeil, Charlotte, NC (US); Philip E. Parker, York, SC (US); David B. Werts, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/799,939

(22) Filed: Mar. 13, 2013

(65) Prior Publication Data

US 2014/0188459 A1    Jul. 3, 2014

Related U.S. Application Data

(63) Continuation-in-part of application No. 13/728,898, filed on Dec. 27, 2012.

(51) Int. Cl.
*G06F 17/27* (2006.01)

(52) U.S. Cl.
CPC ................................ *G06F 17/2785* (2013.01)

(58) Field of Classification Search
CPC ............ G06Q 50/01; G06F 17/30554; G06F 17/30699; G06F 17/2785; G10L 2015/088
See application file for complete search history.

(56) References Cited

U.S. PATENT DOCUMENTS

| | | | |
|---|---|---|---|
| 6,427,137 B2 | 7/2002 | Petrushin |
| 6,553,385 B2 | 4/2003 | Johnson et al. |
| 7,139,752 B2 | 11/2006 | Broder et al. |
| 7,165,033 B1 | 1/2007 | Liberman |
| 7,185,065 B1 | 2/2007 | Holtzman et al. |
| 7,428,554 B1 | 9/2008 | Coberley et al. |
| 7,512,602 B2 | 3/2009 | Broder et al. |

(Continued)

FOREIGN PATENT DOCUMENTS

| | | |
|---|---|---|
| CN | 102385858 | 3/2013 |
| JP | 2004030093 | 1/2004 |

OTHER PUBLICATIONS

Castellanos et al, "LivePulse: Tapping Social Media for Sentiments in Real-Time", Proc of the 20th Intl Conference Companion on World Wide Web, pp. 193-196; Hyderabad, India, Mar. 28-Apr. 1, 2011.*

(Continued)

*Primary Examiner* — Angela A Armstrong
(74) *Attorney, Agent, or Firm* — Janaki K. Davda; Konrad, Raynes, Davda & Victor LLP

(57) ABSTRACT

Provided is a technique for providing an interactive dashboard based on real-time sentiment analysis for synchronous communication. In real time, while monitoring communications between a first user and a second user, a cumulative sentiment score is generated representing a sentiment of the first user during a period of time and an instantaneous sentiment score representing a sentiment of the first user at a current time. In real time, an interactive dashboard is displayed with a visual representation for the first user having a first indicator representing the cumulative sentiment score and a second indicator representing the instantaneous sentiment score.

19 Claims, 18 Drawing Sheets

(56) References Cited

U.S. PATENT DOCUMENTS

| | | | |
|---|---|---|---|
| 7,523,085 B2 | 4/2009 | Nigam et al. | |
| 7,558,778 B2 | 7/2009 | Carus et al. | |
| 7,565,404 B2 | 7/2009 | Gwozdz | |
| 7,640,304 B1 | 12/2009 | Goldscheider | |
| 7,810,033 B2 | 10/2010 | Cordes et al. | |
| 7,822,701 B2 | 10/2010 | Carter et al. | |
| 7,987,188 B2 | 7/2011 | Neylon et al. | |
| 7,996,210 B2 | 8/2011 | Godbole et al. | |
| 8,010,539 B2 | 8/2011 | Blair-Goldensohn et al. | |
| 8,041,669 B2 | 10/2011 | Nigam et al. | |
| 8,086,409 B2 | 12/2011 | Anastassiou et al. | |
| 8,694,357 B2* | 4/2014 | Ting et al. | 705/7.29 |
| 9,224,152 B2 | 12/2015 | Gustafson et al. | |
| 2002/0168664 A1 | 11/2002 | Murray et al. | |
| 2003/0108241 A1 | 6/2003 | Colmenarez et al. | |
| 2004/0243556 A1 | 12/2004 | Ferrucci et al. | |
| 2004/0243645 A1 | 12/2004 | Broder et al. | |
| 2005/0078804 A1 | 4/2005 | Yomoda | |
| 2007/0054277 A1 | 3/2007 | Evans | |
| 2007/0208569 A1* | 9/2007 | Subramanian et al. | 704/270 |
| 2008/0243397 A1 | 10/2008 | Peccoud et al. | |
| 2008/0249764 A1 | 10/2008 | Huang et al. | |
| 2008/0294741 A1 | 11/2008 | Dos Santos et al. | |
| 2009/0210228 A1 | 8/2009 | George | |
| 2009/0216524 A1 | 8/2009 | Skubacz et al. | |
| 2009/0254572 A1 | 10/2009 | Redlich et al. | |
| 2009/0319342 A1 | 12/2009 | Shilman et al. | |
| 2010/0050118 A1 | 2/2010 | Chowdhury et al. | |
| 2010/0082751 A1 | 4/2010 | Meijer et al. | |
| 2010/0114575 A1 | 5/2010 | Itoh et al. | |
| 2010/0121707 A1* | 5/2010 | Goeldi | 705/14.49 |
| 2010/0161746 A1 | 6/2010 | Pilgrim | |
| 2010/0169234 A1 | 7/2010 | Metzger et al. | |
| 2010/0223581 A1* | 9/2010 | Manolescu et al. | 715/853 |
| 2010/0246800 A1 | 9/2010 | Geppert et al. | |
| 2010/0312769 A1 | 12/2010 | Bailey et al. | |
| 2010/0332287 A1 | 12/2010 | Gates et al. | |
| 2011/0144971 A1 | 6/2011 | Danielson | |
| 2011/0208522 A1 | 8/2011 | Pereg et al. | |
| 2012/0057691 A1 | 3/2012 | Moran et al. | |
| 2012/0101805 A1 | 4/2012 | Barbosa et al. | |
| 2012/0101808 A1 | 4/2012 | Duong-Van | |
| 2012/0102041 A1 | 4/2012 | Park et al. | |
| 2012/0102054 A1 | 4/2012 | Popescu et al. | |
| 2012/0130717 A1 | 5/2012 | Xu et al. | |
| 2012/0158989 A1* | 6/2012 | Patil et al. | 709/235 |
| 2012/0215535 A1 | 8/2012 | Wasserblat et al. | |
| 2012/0246054 A1 | 9/2012 | Sastri | |
| 2012/0290622 A1 | 11/2012 | Kumar et al. | |
| 2013/0073571 A1 | 3/2013 | Coulet et al. | |
| 2013/0253910 A1* | 9/2013 | Turner et al. | 704/9 |
| 2013/0254218 A1 | 9/2013 | Friedlander et al. | |
| 2014/0012865 A1 | 1/2014 | Bowman et al. | |
| 2014/0012866 A1 | 1/2014 | Bowman et al. | |

OTHER PUBLICATIONS

International Search Report and Written Opinion for International Application No. PCT/IB2013/054851, Nov. 21, 2013, 10 pp. [57.269PCT (ISR & WO)].

Office Action 1, Jul. 18, 2014, for U.S. Appl. No. 13/533,313, filed Jun. 26, 2012 by D.A. Bhatt, Total 35 pp. [57.269 (OA1)].

Response to Office Action 1, Nov. 11, 2014, for U.S. Appl. No. 13/533,313, filed Jun. 26, 2012 by D.A. Bhatt, Total 14 pp. [57.269 (ROA1)].

Final Office Action, Mar. 13, 2015, for U.S. Appl. No. 13/533,313, filed Jun. 26, 2012 by D.A. Bhatt, Total 20 pp. [57.269 (FOA)].

Office Action 1, Oct. 17, 2014, for U.S. Appl. No. 13/728,898, filed Dec. 27, 2012 by P.W. Fink et al., Total 21 pp. [54.95 (OA1)].

Response to Office Action 1, Jan. 20, 2015, for U.S. Appl. No. 13/728,898, filed Dec. 27, 2012 by P. W. Fink et al., Total 10 pp. [54.95 (ROA1)].

Castellanos, M., R. Ghosh, Y. Lu, L. Zhang, P. Ruiz, M. Dekhil, U. Dayal, and M. Hsu, "LivePulse: Tapping Social Media for Sentiments in Real-Time", Proc of the 20th Intl Conf Companion on World Wide Web, pp. 193-196; Hyderabad, India, Mar. 28-Apr. 1, 2011, DOI: 10.1145/1963192.1963287. [Also Total 4 pp.].

IBM Corp., "A Method to Warn Users of Being Emotional in Email/Chat Before Sending", Technical Disclosure, Jul. 24, 2008, IP.com No. IPCOM000173016D, Total 2 pp.

IBM Corp., "Method and System for E-mail Tone Sensing and Adjustment", Technical Disclosure, Sep. 12, 2008, IP.com No. IPCOM000174540D, Total 3 pp.

Kumar et al., "Method and System for Dynamically Presenting Contents Based on Sentiment of User", IPCOM000211505, Oct. 7, 2011, 2 pages, IP.com. [Also Total 3 pp.].

Lymbix Inc., "ToneCheck", [online], [Retrieved on Jun. 8, 2012]. Retrieved from the Internet at <URL: http://www.lymbix.com/>, Lymbix Inc., © 2009-2011, Total 4 pp.

Ma, C., A. Osherenko, H. Prendinger, and M. Ishizuka, "A Chat System Based on Emotion Estimation from Text and Embodied Conversational Messengers", (Preliminary Report), IEEE, 2005 Total 3 pp (Also pp. 546-548).

Mashable, Inc., "How a Sentiment Analysis Startup Profits by Checking in E-mail", [online], [Retrieved on Jun. 8, 2012]. Retrieved from the Internet at <URL: http://mashable.com/2011/01/20/lymbix/>, Total 13 pp.

"Text Tone Switching Method", Jan. 14, 2011, IP.com No. IPCOM000203011D, Technical Disclosure, Total 4 pp.

U.S. Appl. No. 13/533,313, filed Jun. 26, 2012, entitled "Real-Time Message Sentiment Awareness", invented by Bhatt, D.A., Total 35 pp. [57.269 (Appln)].

U.S. Appl. No. 13/728,898, filed Dec. 27, 2012, entitled "Real-Time Sentiment Analysis for Synchronous Communication", invented by Fink, P.W., K.E. McNeil, P.E. Parker, and D.B. Werts, Total 39 pp. [54.95 (Appln)].

Wikipedia, "Sentiment Analysis", [Retrieved on Nov. 13, 2012]. Retrieved from the Internet at <URL: http://en.wikipedia.org/wiki/Sentiment_analysis>, Total 4 pp.

Mell, P. and T. Grance, "The NIST Definition of Cloud Computing (Draft)", Jan. 2011, Computer Security Division Information Technology Laboratory National Institute of Standards and Technology, Total 7 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Sabita Barik et al.; "Discovery using Fuzzy FP-growth Algorithm from Gene Expression Data"; International Journal of Advanced Computer Science and Applications (IJACSA), vol. 1, No. 5, Nov. 2010; Publisher: Institute of Technical Education and Research, India, Total 6 pp.

English Abstract & Translation for JP2004030093A, published Jan. 29, 2004, Total 18 pp.

Preliminary Amendment, dated Sep. 20, 2012, for U.S. Appl. No. 13/541,475, filed Jul. 3, 2012, entitled, "Using Annotators in Genome Research", invented by Stephan D. Bowman et al., pp. 1-13.

Preliminary Amendment, dated May 2, 2013, for U.S. Appl. No. 13/541,475, filed Jul. 3, 2012, entitled, "Using Annotators in Genome Research", invented by Stephan D. Bowman et al., pp. 1-5.

Office Action, dated Feb. 2, 2014, for U.S. Appl. No. 13/541,475, filed Jul. 3, 2012, entitled, "Using Annotators in Genome Research", invented by Stephen D. Bowman et al., Total 12 pages.

Response to Office Action, dated May 27, 2014, for U.S. Appl. No. 13/541,475, filed Jul. 3, 2012, entitled, "Using Annotators in Genome Research", invented by Stephen D. Bowman et al., Total 15 pages.

Final Office Action, dated Aug. 20, 2014, for U.S. Appl. No. 13/541,475, filed Jul. 3, 2012, invented by Stephen D. Bowman et al., Total 19 pages.

Response to Final Office Action, dated Nov. 20, 2014, for U.S. Appl. No. 13/541,475, filed Jul. 3, 2012, invented by Stephen D. Bowman et al., Total 13 pages.

(56) References Cited

OTHER PUBLICATIONS

Office Action, dated Dec. 15, 2014, for U.S. Appl. No. 13/541,475, filed Jul. 3, 2012, invented by Stephen D. Bowman et al., Total 21 pages.
Response to Office Action, dated Mar. 18, 2015, for U.S. Appl. No. 13/541,475, filed Jul. 3, 2012, invented by Stephen D. Bowman et al., Total 10 pages.
Notice of Allowance, dated Apr. 6, 2015, for U.S. Appl. No. 13/541,475, filed Jul. 3, 2012, invented by Stephen D. Bowman et al., Total 10 pages.
Preliminary Remarks, dated May 2, 2013, for U.S. Appl. No. 13/875,713, filed May 2, 2013, entitled, "Using Annotators in Genome Research", invented by Stephen D. Bowman et al., Total 2 pages.
Office Action, dated Feb. 28, 2014, for U.S. Appl. No. 13/875,713, filed May 2, 2013, entitled, "Using Annotators in Genome Research", invented by Stephen D. Bowman et al., Total 21 pages.
Response to Office Action, dated May 27, 2014, for U.S. Appl. No. 13/875,713, filed May 2, 2013, entitled, "Using Annotators in Genome Research", invented by Stephen D. Bowman et al., Total 13 pages.
Final Office Action, dated Aug. 21, 2014, for U.S. Appl. No. 13/875,713, filed May 2, 2013, invented by Stephen D. Bowman et al., Total 21 pages.
Response to Final Office Action, dated Nov. 20, 2014, for U.S. Appl. No. 13/875,713, filed May 2, 2013, invented by Stephen D. Bowman et al., Total 12 pages.
Office Action, dated Dec. 15, 2014, for U.S. Appl. No. 13/875,713, filed May 2, 2013, invented by Stephen D. Bowman et al., Total 22 pages.
Response to Office Action, dated Mar. 18, 2015, for U.S. Appl. No. 13/875,713, filed May 2, 2013, invented by Stephen D. Bowman et al., Total 8 pages.
Notice of Allowance, dated Apr. 6, 2015, for U.S. Appl. No. 13/875,713, filed May 2, 2013, invented by Stephen D. Bowman et al., Total 10 pages.
Response to Final Office Action, dated Jul. 28, 2015, for U.S. Appl. No. 13/728,898, filed Dec. 27, 2012, invented by P.W. Fink et al., Total 11 pp.
English Google Translation for CN102385858, published on Jun. 5, 2013, Total 14 pp.
Response to Final Office Action, dated Jun. 30, 2015, for U.S. Appl. No. 13/533,313, filed Jun. 26, 2012, invented by Dhruv A. Bhatt et al., Total 13 pages.
Final Office Action, dated Apr. 28, 2015, for U.S. Appl. No. 13/728,898, filed Dec. 27, 2012, invented by P.W. Fink et al., Total 14 pp.
Office Action 3, Feb. 11, 2016, for U.S. Appl. No. 13/728,898, filed Dec. 27, 2012 by P.W. Fink et al., Total 18 pp.
Min et al., "Detecting and Blocking False Sentiment Propagation" dated Nov. 8-13, 2011, Proceedings of the 5th International Joint Conference on National Language, Total 9 pages.
Office Action 3, Mar. 9, 2016, for U.S. Appl. No. 13/533,313, filed Jun. 26, 2012 by Dhruv A. Bhatt et al., Total 31 pages.
Response to Office Action 3, May 10, 2016, for U.S. Appl. No. 13/728,898, filed Dec. 27, 2012 by P.W. Fink et al., Total 10 pp.
Response to Office Action 3, Jul. 6, 2016, for U.S. Appl. No. 13/533,313, filed Jun. 26, 2012 by D.A. Bhatt, Total 13 pp.

* cited by examiner

600

ANALYSIS TEXT:
I am unhappy with the way the product is operating.
--------------------------------------------------------------------------------
LANGUAGE:
English ANNOTATIONS:
document:
start position 0, end position 52 paragraph:
start position 0, end position 52 token:
start position 0, end position 1
start position 3, end position 5
start position 6, end position 13
...
start position 41, end position 50
start position 51, end position 52

NegativeSentiment annotation:
start position 6, end position 13
...

ANALYSIS TEXT:
I am unhappy with the way the product is operating.
--------------------------------------------------------------------------------
LANGUAGE:
English ANNOTATIONS:
document:
start position 0, end position 52 paragraph:
start position 0, end position 52 token:
start position 0, end position 1
start position 3, end position 5
start position 6, end position 13
...
start position 41, end position 50
start position 51, end position 52

NegativeSentiment annotation:
start position 6, end position 13
...

ObjectOfSentiment annotation:
start position 26, end position 38
...
```

ANALYSIS TEXT:
I am unhappy with the way the product is operating.
------------------------------------------------------------------
LANGUAGE:
English ANNOTATIONS:
document:
start position 0, end position 52 paragraph:
start position 0, end position 52 token:
start position 0, end position 1
start position 3, end position 5
start position 6, end position 13
...
start position 41, end position 50
start position 51, end position 52

NegativeSentiment annotation:
start position 6, end position 13
...

ObjectOfSentiment annotation:
start position 26, end position 38
...

FIG. 8

# INTERACTIVE DASHBOARD BASED ON REAL-TIME SENTIMENT ANALYSIS FOR SYNCHRONOUS COMMUNICATION

CROSS-REFERENCE TO RELATED APPLICATION

This application is a continuation-in-part application and claims the benefit of U.S. application Ser. No. 13/728,898, filed Dec. 27, 2012, and the entire contents of this application are incorporated herein by reference.

FIELD

Embodiments of the invention relate to interactive dashboard based on real-time sentiment analysis for synchronous communication.

BACKGROUND

In current technological environments, customers have many ways of influencing others with respect to their experiences with a product or company. Considering the explosive expansion of social media, an individual can easily tarnish the reputation of a company. If one "vocal" customer is dissatisfied with an interaction with a company, the customer may tell others about the interaction such that this may lead to future lost sales for the company.

A common way for a company to interact with a customer is via a call center. A call center receives many calls each day. To handle the load, the call center has numerous call handlers and a few floor managers (e.g., supervisors). The managers typically handle complex customer issues, ensure customer satisfaction, ensure reasonable response times, and quick resolutions. Currently call center employees handle the call and use their discretion to determine whether or not they need to have a manager involved. However, it might not be in the employee's best interest to notify the manager of an unsatisfied customer or the employee might not realize the high level of dissatisfaction. As a result, the customer might leave the call dissatisfied without the manager knowing about it.

Managers may check calls using random call screening or may obtain information about a customer being dissatisfied after the call is over.

In the current environment of technology, customers have many ways of influencing others related to their experiences with a product or company. For example, with the rise of activity on social media networks, blogs, and other technologies, one person's negative opinion may have a cascading effect. Therefore, companies want their customers to be satisfied at the end of any customer interaction made, such as a call into a call center or an encounter in a chat session.

SUMMARY

Provided are a method, computer program product, and system for providing an interactive dashboard based on real-time sentiment analysis for synchronous communication. In real time, while monitoring communications between a first user and a second user, a cumulative sentiment score is generated representing a sentiment of the first user during a period of time and an instantaneous sentiment score representing a sentiment of the first user at a current time. In real time, an interactive dashboard is displayed with a visual representation for the first user having a first indicator representing the cumulative sentiment score and a second indicator representing the instantaneous sentiment score.

BRIEF DESCRIPTION OF THE SEVERAL VIEWS OF THE DRAWINGS

Referring now to the drawings in which like reference numbers represent corresponding parts throughout:

FIG. 2 is formed by FIG. 2A and FIG. 2B.

FIG. 6 illustrates a logical representation of a CAS after a second UIMA stage in accordance with certain embodiments.

FIG. 7 illustrates a logical representation of a CAS after a third UIMA stage in accordance with certain embodiments.

FIG. 8 illustrates a logical representation of a CAS after a fourth UIMA stage in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
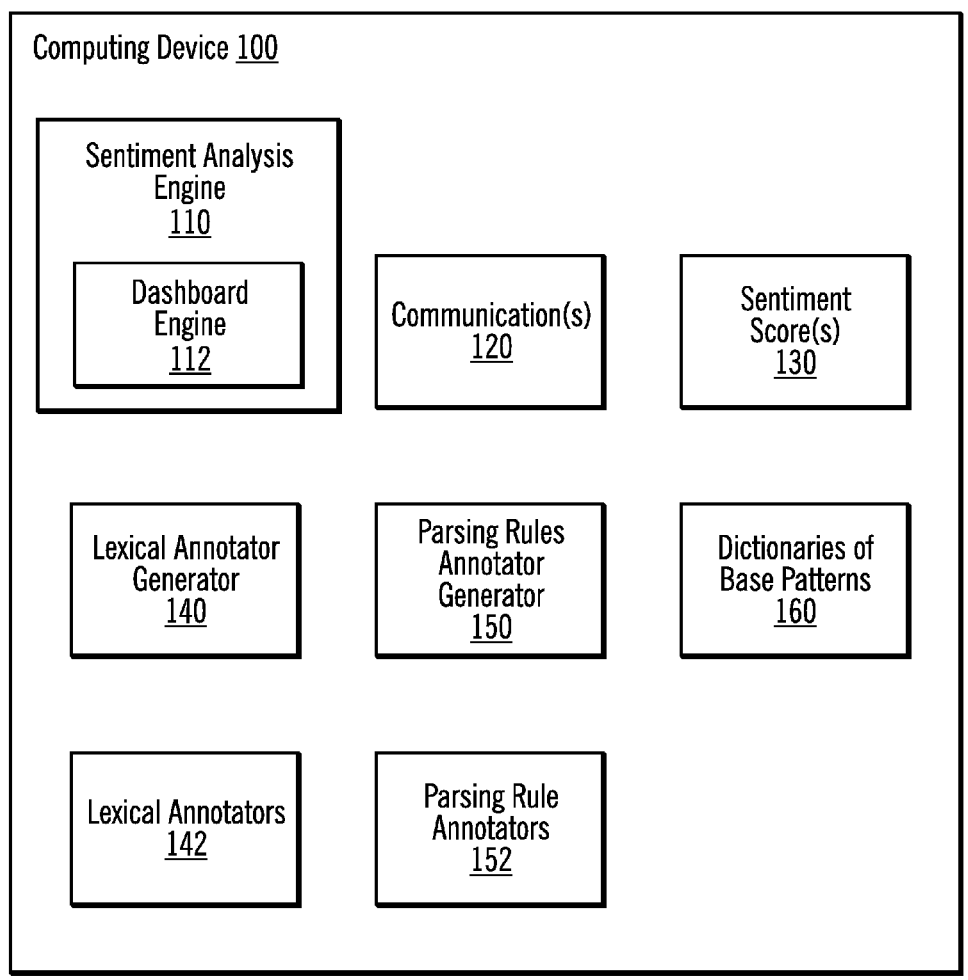
FIG. 1 illustrates a computing architecture in accordance with certain embodiments.

FIG. 1 illustrates a computing architecture in accordance with certain embodiments. In FIG. 1, a computing device 100 includes a sentiment analysis engine 110, one or more communications 120, and one or more sentiment scores 130. The sentiment analysis engine 110 includes a dashboard engine 112.

In certain embodiments, the communications 120 are stored in text format for further processing. Each of the one or more sentiment scores 130 is associated with a sentiment. A sentiment may be described as an attitude of a user (e.g., a speaker or a writer) with respect to the conversation. For example, the sentiment may represent the emotional state of the user (e.g., polite, aggressive, neutral, positive, negative, etc.). A specific emotional state (e.g., polite, aggressive, neutral, positive, negative, etc.) may be described as a sentiment type. The sentiment score 130 may indicate the sentiment (e.g., polite, aggressive, neutral, positive, negative, etc.) and a strength of the sentiment.

The dashboard engine 112 provides a real-time visual representation of user sentiment (e.g., a speaker or a writer; a customer or company representative) using a user interface, referred to herein as an "interactive dashboard" to enable another user (e.g., the company representative or a manager) to improve the communication or take appropriate action (e.g., when the sentiment is below a certain level to ensure the customer is satisfied). A dashboard user may be any user using the interactive dashboard.

The computing device 100 also includes a lexical annotator generator 140 and a parsing rule annotator generator 150. The computing device 100 also includes one or more dictionaries of base patterns 160. The lexical annotator generator 140 enables a user to create and edit one or more lexical annotators 142 by selecting (e.g., entering via an input device or a user interface) a chunk (e.g., a sequence of characters, tokens, words, sentences, topics (e.g., sentences related to a similar concept), etc.). The parsing rule annotator generator 150 enables a user to create and edit one or more parsing rule annotators 152 by selecting (e.g., entering via an input device or a user interface) any combination of a chunk, dictionary entries (from the dictionaries of base patterns 440), lexical annotators 142, and/or previously-defined parsing rule annotators 152. A character rule may be described as a type of lexical annotator 142. In certain embodiments, the lexical annotator generator 140 is an editor. In certain embodiments, the parsing rule annotator generator 150 is an editor.

The sentiment analysis engine 110 monitors sentiments of a customer and a company representative during interactions, in real-time (e.g., as the communications 120 between them are occurring), between them and outputs measurements of the sentiments. With the measurements of the sentiments of the customer and the company representative, the company may implement policies to make changes (e.g., changing the representative, routing the customer to a manger, addressing the customer's problem or concern, providing a partial refund, etc.) based on the sentiments to improve the interaction (e.g., when the sentiment of the customer or the company representative is below a certain level to ensure the customer is happy). Monitoring of the company representative also enables checking whether the company representative is in compliance with customer service guidelines.

In certain embodiments, the sentiment analysis engine 110 enables management of communication between the customer and the company representative to determine overall quality of customer satisfaction. The sentiment analysis engine 110 may alert management, in real time, of problematic communications before the communication (occurring in real-time) is escalated (e.g., to a point at which the customer is "yelling" at the company representative or using negative words in a written communication).

In certain embodiments, the level of negative sentiment may be an indicator of priority of calls (especially when management staffing levels may be inadequate).

Figure 2A:
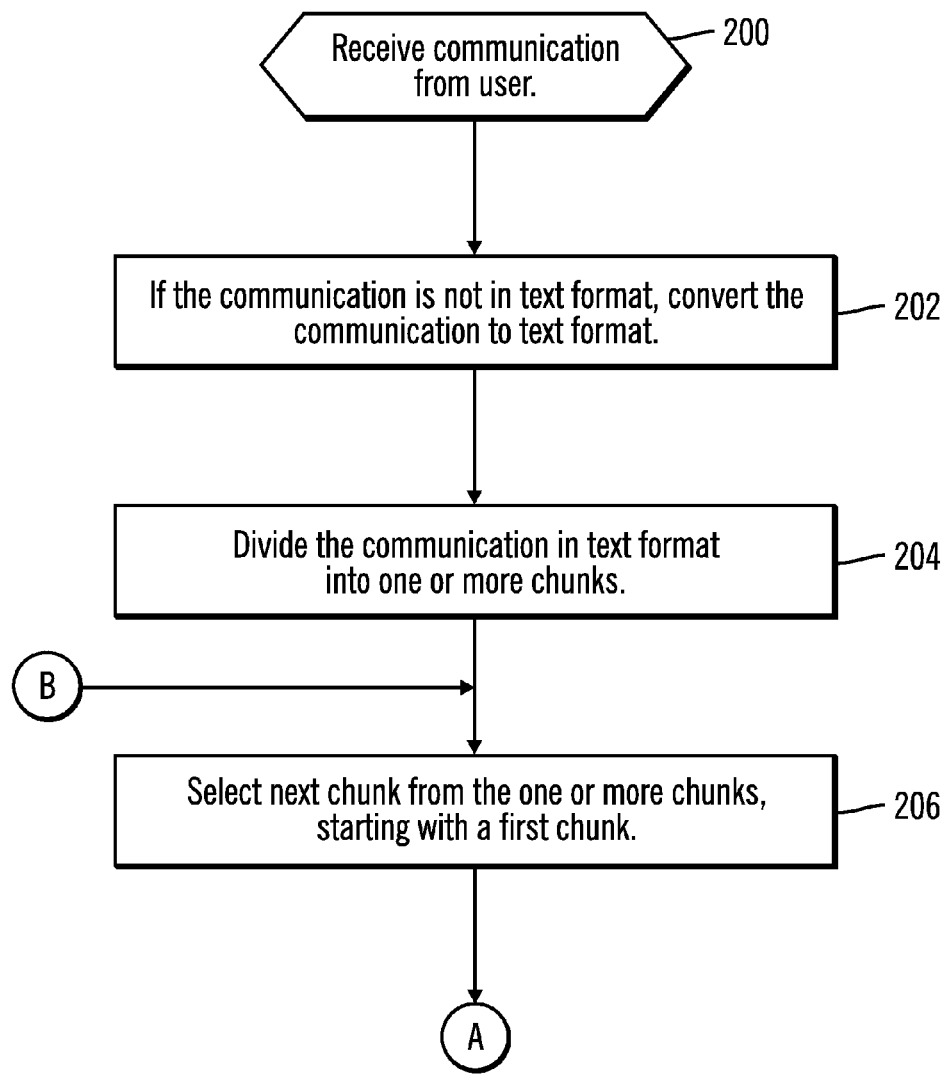
FIG. 2 illustrates, in a flow diagram, operations performed to generate sentiment scores in accordance with certain embodiments.
Figure 2B:
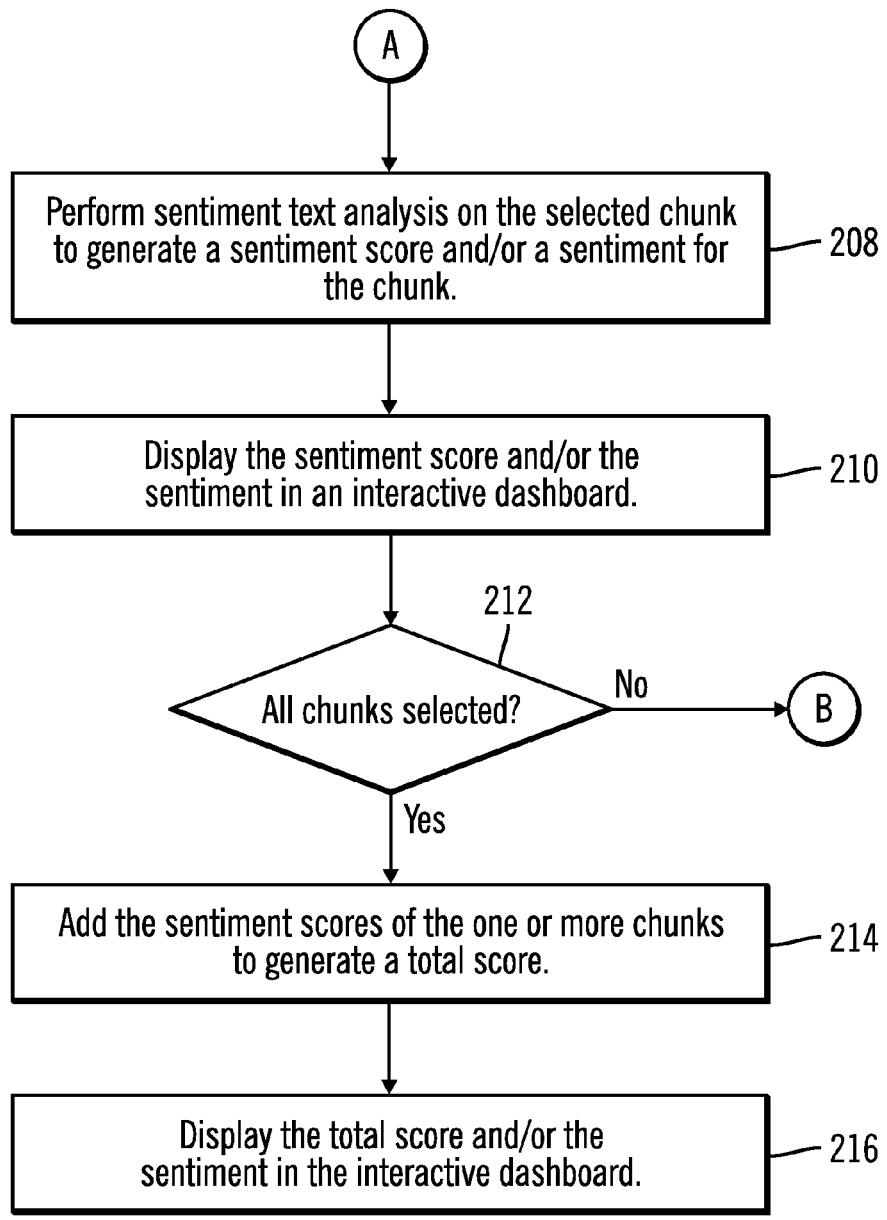

FIG. 2 illustrates, in a flow diagram, operations performed to generate sentiment score $130s$ in accordance with certain embodiments. FIG. 2 is formed by FIG. 2A and FIG. 2B. Control begins at block 200 with the sentiment analysis engine 110 receiving a communication 120 from a user (e.g., a customer or company representative). For example, a customer may contact a business, a provider or a service (e.g., customer service) through, for example, a text message (e.g., an "instant message"), a chat message or a phone call.

In block 202, if the communication 120 is not received in text format (e.g., the communication 120 is a voice message via a phone call), the sentiment analysis engine 110 automatically converts the communication 120 to text format.

In block 204, the sentiment analysis engine 110 divides the communication 120 in text format into one or more chunks.

In block 206, the sentiment analysis engine 110 selects a next chunk from the one or more chunks, starting with a first chunk. From block 206 (FIG. 2A), processing continues to block 208 (FIG. 2B).

In certain embodiments, the sentiment analysis engine 110 performs text analytics on the user communication 120 using "chunks" in real time. The size of the chunks may be customized. For example, a chunk may be a set of five words. As additional examples, a chunk may be a set of words that ends after a period (e.g., the punctuation "."), after a subject, after a verb, after a predicate, etc. In certain embodiments, the chunks are specific word clusters of interest (e.g., logical sections of text in which sentiment indicators are changing). In certain embodiments, a chunk of text is gathered when there is a change in the party that is currently conversing (e.g., when the customer finishes a communication 120 and the company representative starts a communication 120). In certain embodiments, the chunk of text is gathered when there is a pause greater than a configurable threshold. In certain embodiments, the chunk of text is gathered during a regular configurable time interval (e.g., every 5 seconds). In certain embodiments, the chunk of text is gathered when certain words are detected based on dictionary match (e.g., "cancel" or "not happy"). In certain embodiments, the chunk of text is gathered when a communicator (e.g., user who is inputting a communication) changes.

In block 208, the sentiment analysis engine 110 performs sentiment text analysis on the selected chunk to generate a sentiment score 130 and/or a sentiment for the chunk using a natural language processing framework. In certain embodiments, the sentiment analysis engine 110 associates weights with terms (e.g., in a dictionary) and maintains a running window of summation of equally-weighted positive and negative terms. In certain embodiments, the sentiment analysis engine 110 has a running window of summation of weighted positive and negative terms based on system-configurable word list lookup tables containing scores per word. In certain embodiments, the sentiment analysis engine 110 is trained prior to deployment. During this training, an operator scoring phrases during a conversation, and these scores of phrases are used to create a dictionary and are input into a machine learning system that is used in sentiment analysis engine 110 deployments to automatically score user interactions based on known or learned patterns.

In block 210, the sentiment analysis engine 110, displays the sentiment score 130 and/or the sentiment in an interactive dashboard. In certain embodiments, the sentiment score 130 of a customer is displayed to the company representative or other person working for the company (e.g., a manager). In certain embodiments, the sentiment score 130 of a company representative may be displayed to the company representative (to enable the company representative to adjust the tone, format, etc. of the communication 120 or to transfer the customer to another company representative) or may be displayed to another person working for the company (e.g., a manager) who may implement company policies (e.g., transfer the customer to another company representative). The sentiment score 130 is displayed so that user sentiment may be visualized in real time.

In block 212, the sentiment analysis engine 110 determines whether all chunks have been selected. If so, processing continues to block 214, otherwise, processing loops back to block 206 (FIG. 2A).

In block 214, the sentiment analysis engine 110 adds the sentiment scores 130 of the one or more chunks to generate a total score. In block 216, the sentiment analysis engine 110 displays the total score and/or the sentiment in the interactive dashboard. The total score is displayed so that user sentiment may be visualized in real time.

Natural Language Processing (NLP) may be described as a field of computer science, artificial intelligence, and linguistics related to interactions between computers and human (natural) languages. In certain embodiments, NLP is used to enable the sentiment analysis engine 110 to derive meaning from natural language input (e.g., text input representing a communication from a user).

Unstructured Information Management Architecture (UIMA) may be described as a software architecture that uses analytics for the analysis of unstructured information. UIMA may be described as an example of an NLP framework. General Architecture for Text Engineering (GATE) may be described as another example of an NLP framework.

In certain embodiments, the sentiment analysis engine 110 includes or uses a UIMA framework to detect sentiment in communications 120. In particular, the sentiment analysis engine 110 uses standard UIMA annotators with parsing rules specifically tailored to detect sentiment in communications 120. The lexical annotator generator 140 and the parsing rule annotator generator 150 are used to build custom text analytics annotators for UIMA pipelines. Text analytics is used in environments in which linguistic grammars, dictionaries, and parsing rules are utilized to help tease meaning from text sources. An annotator may be described as a collection of character and/or parsing rules that are related in some way. In certain embodiments, an annotator may also be described as a text analysis engine that breaks apart a stream of words and groups individual words into a chunk to be analyzed for sentiment. The UIMA framework uses these annotators to help find matches in the text being analyzed. When a match is found (e.g., when an annotator rule is satisfied), an annotation is recorded in a Common Analysis Structure (CAS) that identifies the match, its location in the text, etc. Thus, the annotator is a tool to help find matches. An annotation may be described as the match that has been found and noted in the CAS.

Figure 3:
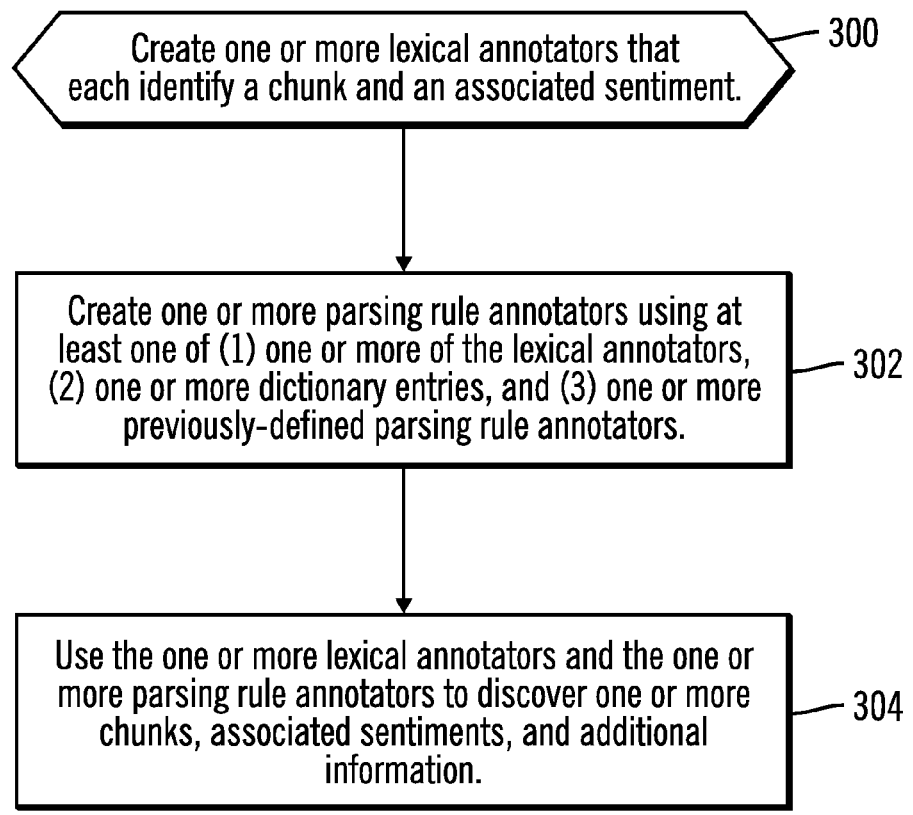
FIG. 3 illustrates, in a flow diagram, operations performed to locate a communication pattern in analytic text in accordance with certain embodiments.

FIG. 3 illustrates, in a flow diagram, operations performed to locate a communication pattern in analytic text in accordance with certain embodiments. A communication pattern may be described as any pattern of communication (e.g., in text or voice) that matches any of the lexical or parsing rules being performed by the annotator. Control begins at block 300 with creation of one or more lexical annotators that each identify a chunk and an associated sentiment. In certain embodiments, a lexical annotator may be described as a rule for identifying a chunk that associates a sentiment with that chunk. In block 302, one or more parsing rule annotators are created using at least one of (1) one or more of the lexical annotators, (2) one or more dictionary entries, and (3) one or more previously-defined parsing rule annotators. For example, a parsing rule annotator may be created that identifies an object of a sentiment. In this example, the object of the sentiment is the person, item, etc. at which the sentiment is directed. In certain embodiments, a parsing rule annotator indicates an order and a combination of the one or more lexical annotators, the one or more dictionary entries, and other parsing rule annotators relative to each other. In block 304, the one or more lexical annotators and the one or more parsing rule annotators are used to discover one or more chunks, associated sentiments, and additional information (e.g. associated objects of the sentiments, sentiment scores, etc.). For example, in the communication: "I am unhappy with the way the product is operating", the word "unhappy" may be identified as a negative sentiment, and the words "the product" may be identified as the object of the sentiment.

Figure 4:
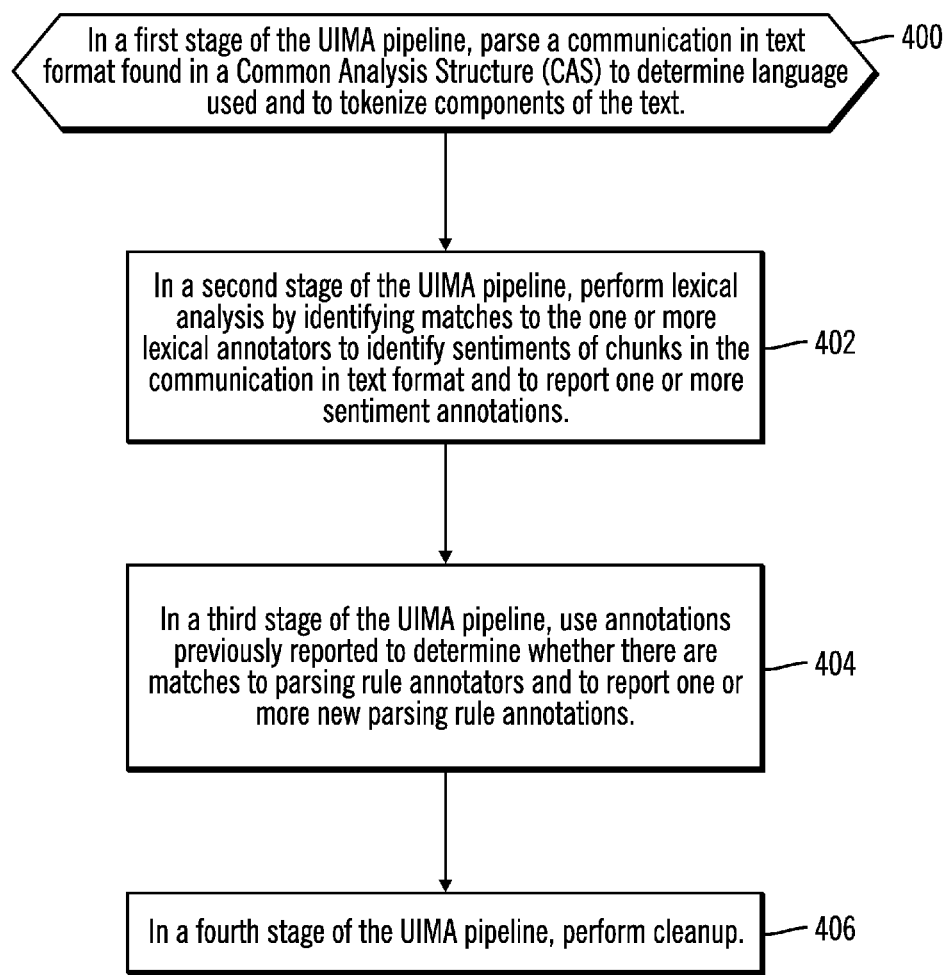
FIG. 4 illustrates, in a flow diagram, operations performed to use an Unstructured Information Management Architecture (UIMA) pipeline in accordance with certain embodiments.

FIG. 4 illustrates, in a flow diagram, operations performed to use an Unstructured Information Management Architecture (UIMA) pipeline in accordance with certain embodiments. Control begins at block 400, where, in a first stage of the UIMA pipeline, communication in text format found in a Common Analysis Structure (CAS) is parsed to determine language used and to tokenize components of the text. In block 402, in a second stage of the UIMA pipeline, lexical analysis is performed by identifying matches to the one or more lexical annotators to identify sentiments of chunks in the communication in text format and to report one or more sentiment annotations. Reporting an annotation may be described as storing the annotation in the CAS. In block 404, in a third stage of the UIMA pipeline, annotations previously reported (e.g., in block 402) are used to determine whether there are matches to parsing rule annotators and to report one or more new parsing rule annotations. In block 406, in a fourth stage of the UIMA pipeline, cleanup is performed.

Merely to enhance understanding, an example using a UIMA pipeline is illustrated in FIGS. 5-8.

Figure 5:
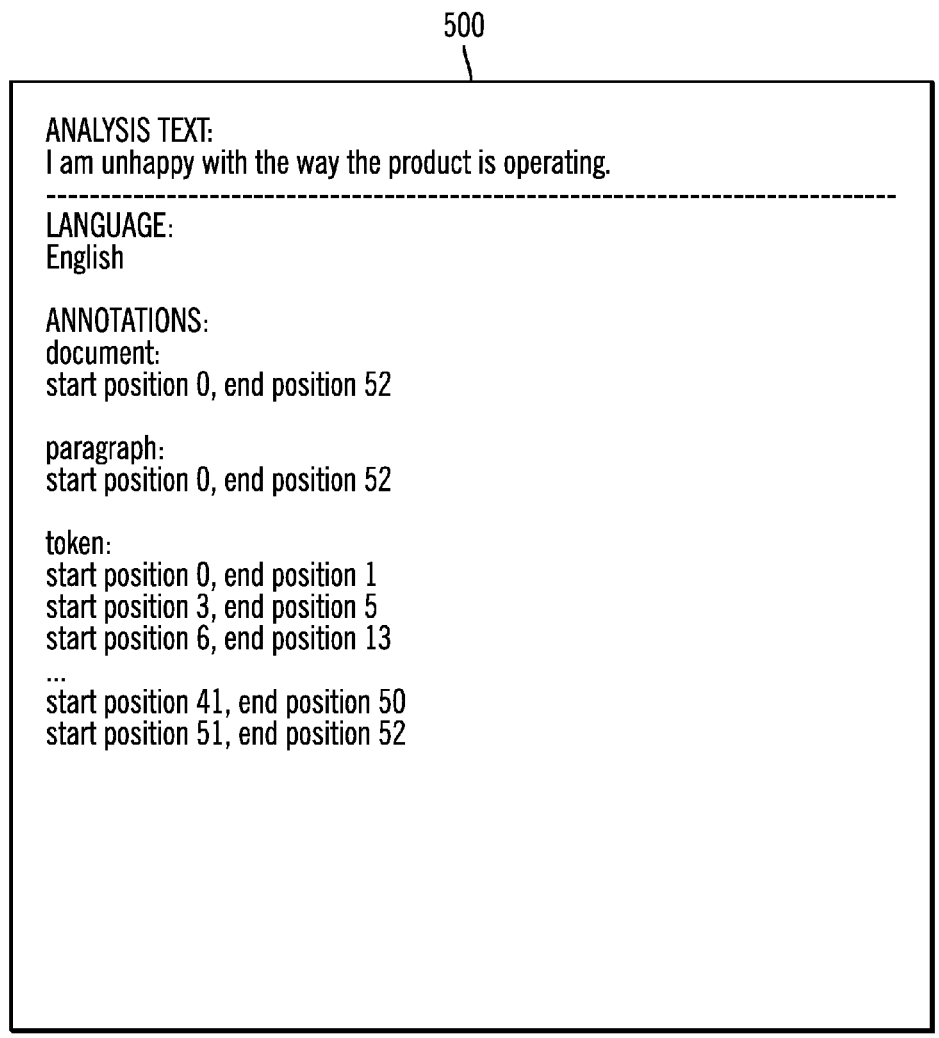
FIG. 5 illustrates a logical representation of a Common Analysis Structure (CAS) after a first UIMA stage in accordance with certain embodiments.

FIG. 5 illustrates a logical representation of a Common Analysis Structure (CAS) 500 after a first UIMA stage in accordance with certain embodiments. The first logical stage of the UIMA pipeline is used to parse the analysis text found in the CAS (Common Analysis Structure) to determine language used, as well as, to tokenize various components of the natural language text. In the example of FIG. 5, the language used defaults to English. This example also assumes that a "change of party chunking technique" is being used (e.g., analyzing a chunk of text each time there has been a change of party during the conversation).

FIG. 6 illustrates a logical representation of a CAS 600 after a second UIMA stage in accordance with certain embodiments. The second logical stage of the UIMA pipeline is to work through the lexical annotators. In the example of FIG. 6, dictionaries of base patterns that have been created are "executed" to determine whether there are any new annotations that can be made against the analysis text being analyzed. A NegativeSentiment annotation is added to the CAS in FIG. 6 to indicate that "unhappy" is a negative sentiment.

FIG. 7 illustrates a logical representation of a CAS 700 after a third UIMA stage in accordance with certain embodiments. The third logical stage of the UIMA pipeline is to work through the parsing rule annotators. In the example of FIG. 7, a simple parsing rule is demonstrated that identifies the object of sentiment, and this is referred to as an "ObjectOfSentiment" parsing rule. Using the one or more annotations already created in the previous stages of the UIMA pipeline, the UIMA framework uses the "ObjectOfSentiment" parsing rule to see whether there are any matches in the analysis text. The terms "the product" matches the "ObjectOfSentiment" parsing rule requirements and is annotated.

FIG. 8 illustrates a logical representation of a CAS 800 after a fourth UIMA stage in accordance with certain embodiments. The UIMA cleanup stage is used to do any cleanup work necessary on the CAS that has been generated and populated thus far in the process. For the example of FIGS. 5-7, nothing is required in this stage (e.g., the CAS remains the same).

In certain embodiments, a "CAS consumer" is any component in the UIMA framework that uses the CAS for information. There are two main consumers of the CAS: each successive stage in the UIMA pipeline and the final consumer at the end of the pipeline.

When the UIMA pipeline is constructed, each successive stage, after the first, uses the CAS to determine whether additional annotations are added or removed from the CAS. Consumers down stream see these modifications and do not need to reparse the natural language text. The final CAS consumer is a computer process that "reads" which annotations have been located in the natural language text and "acts" on the annotations. This can initiate additional processing or it can be as simple as reporting the information to some interface (e.g., a graphical user interface). In addition, the annotations may be used in sentiment scoring by the sentiment analysis engine 110.

Thus, in certain embodiments, the sentiment analysis engine 110 may be considered an outside process that consumes the annotations and adds scores to the annotations. In certain embodiments, the sentiment analysis engine 110 may display the annotations and scores in a User Interface (UI) or interact with a telecommunications device (e.g., in the phone situation, a manager is automatically notified that there is a problem and the manager is allowed to listen in on the conversation).

In certain embodiments, the sentiment analysis engine 110 uses natural language processing to determine real-time sentiments. In certain embodiments, the sentiment analysis engine 110 uses natural language processing to capture topical chunks of each communication 120 and to determine the sentiment of the chunks. This sentiment may then be displayed (e.g., in a user interface).

Using natural language processing, the sentiment analysis engine 110 determines the sentiment of the customer and the company representative at various points during the communications 120 (e.g., via text message, chat or phone call). The sentiment analysis engine 110 calculates both cumulative (e.g., spanning multiple chunks (e.g., spanning a portion of the conversation or the entire length of the conversation)) and instantaneous sentiments based on analysis of the text of the conversation.

Synchronous systems, such as "support chat" (e.g., a chat session between a customer and a company representative) are becoming more common, while traditional voice communication 120 (e.g., telephone) is on the decline. In either case, it is useful to determine the sentiment/meaning/mood of the customer, as well as, the company representative. The sentiment analysis engine 110 provides real time sentiment analysis to help identify sentiments and bridge any gap in communication 120.

Dashboard

In certain embodiments, the dashboard engine 112 provides a snapshot of the instantaneous sentiment score, as well as, a cumulative sentiment score for a first user in communication with a second user. In certain embodiments, the dashboard engine 112 provides a snapshot of the instantaneous sentiment score, as well as, a cumulative sentiment score for the first user and for the second user.

In certain embodiments, the instantaneous sentiment score represents a sentiment at a current time, and the cumulative sentiment score represents a sentiment during a period of time during which the communication occurred. In certain embodiments, the instantaneous sentiment score and the cumulative sentiment score may represent different sentiments (e.g., the instant sentiment score may indicate a positive attitude, while the cumulative sentiment score may indicate a negative attitude).

In certain embodiments, the dashboard engine 112 provides a set of visual representations (e.g., circular gauges or equalizers), allowing supervisors to see customer sentiment at a point in time by analyzing sentiment chunks, in addition to, the cumulative level of satisfaction. The dashboard engine 112 provides relevant actions and coding (e.g., using colors, patterns, etc.) based on the gauge reading and allows a dashboard user to join the communication and intervene directly, to listen to all or portions of the communication associated with a given level of sentiment detected on the gauges or review the communication in its entirety with indication of critical chunks of text (e.g., extreme portions of negative sentiment where a customer might be extremely angry, dissatisfied, etc.) and their associated sentiment. In certain embodiments, gauge coding indicates a range of negative to positive sentiment (e.g., represented by a color gradient from red to yellow to green).

In certain embodiments, the sentiment analysis engine 110 uses natural language processing to determine real-time sentiments based on call center customer interactions. Using natural language processing, the sentiment analysis engine 110 determines the sentiment of the customer and the company representative at various points during the communications 120 (e.g., via text message, chat or phone call). The sentiment analysis engine 110 calculates both cumulative (e.g., spanning multiple chunks (e.g., spanning a portion of the conversation or the entire length of the conversation)) and instantaneous sentiments based on analysis of the text of the conversation.

The dashboard engine 112 displays the sentiment using the sentiment scores generated by the sentiment analysis engine 110. This allows a dashboard user to view and monitor communications between a customer and a company representative. If a customer's sentiment drops, the dashboard user may immediately listen in on the communication or advise the company representative. Thus the dashboard user may be able to intercept a customer's negative opinion of the product, company or company representative and try to improve that opinion prior to the customer ending the communication.

In certain embodiments, the dashboard engine 112 displays both the cumulative and instantaneous sentiments. FIGS. 9-13 illustrated examples of dashboards.

Figure 9:
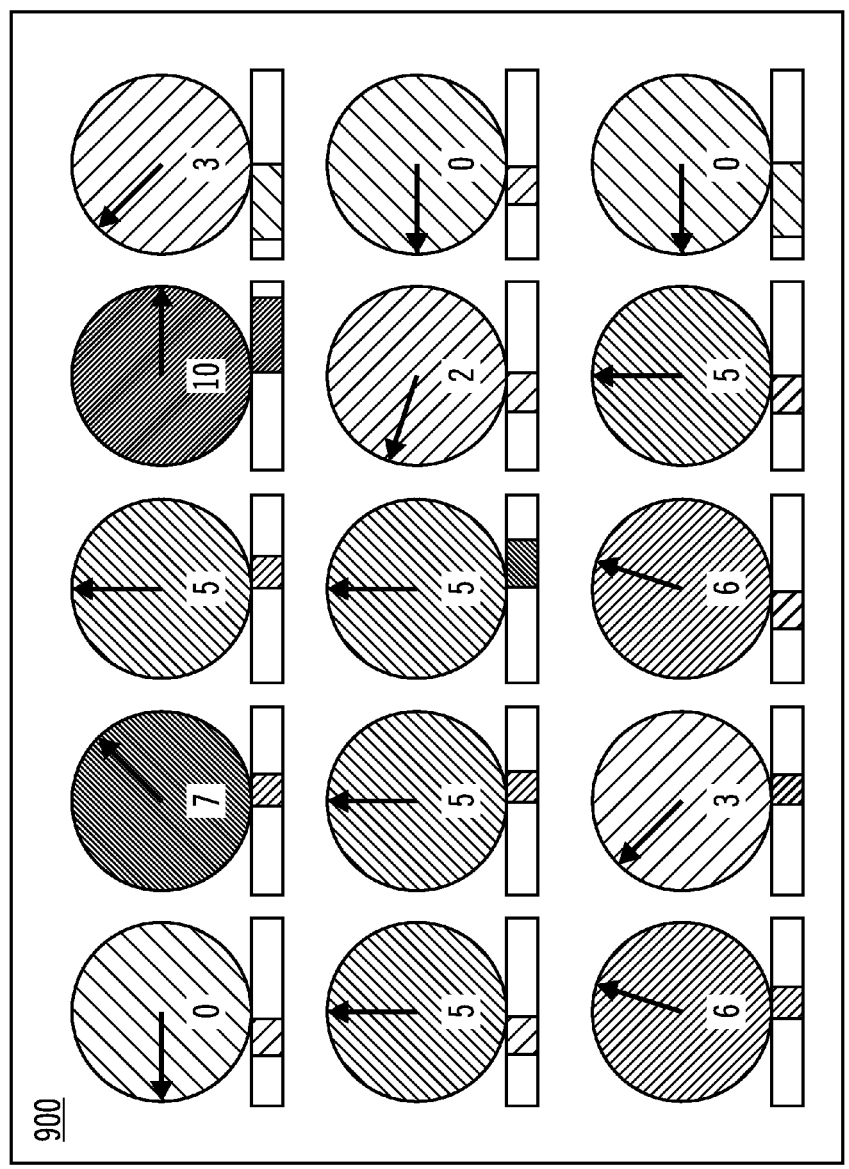
FIG. 9 illustrates an example circular gauge dashboard in accordance with certain embodiments.

FIG. 9 illustrates an example circular gauge dashboard 900 in accordance with certain embodiments. In FIG. 9, each separate, circular gauge represents a different communication (each between two or more users, such as a customer and a company representative). In FIG. 9, for each circular gauge, a cumulative sentiment score is indicated by a needle position and a pattern of that circular gauge. In FIG. 9, for each circular gauge, the instantaneous (most recent sample) sentiment score is depicted by a bar graph below the circular gauge. Using the circular gauges, a good sense of the sentiment, as well as, the current trend may be determined.

Figure 10:
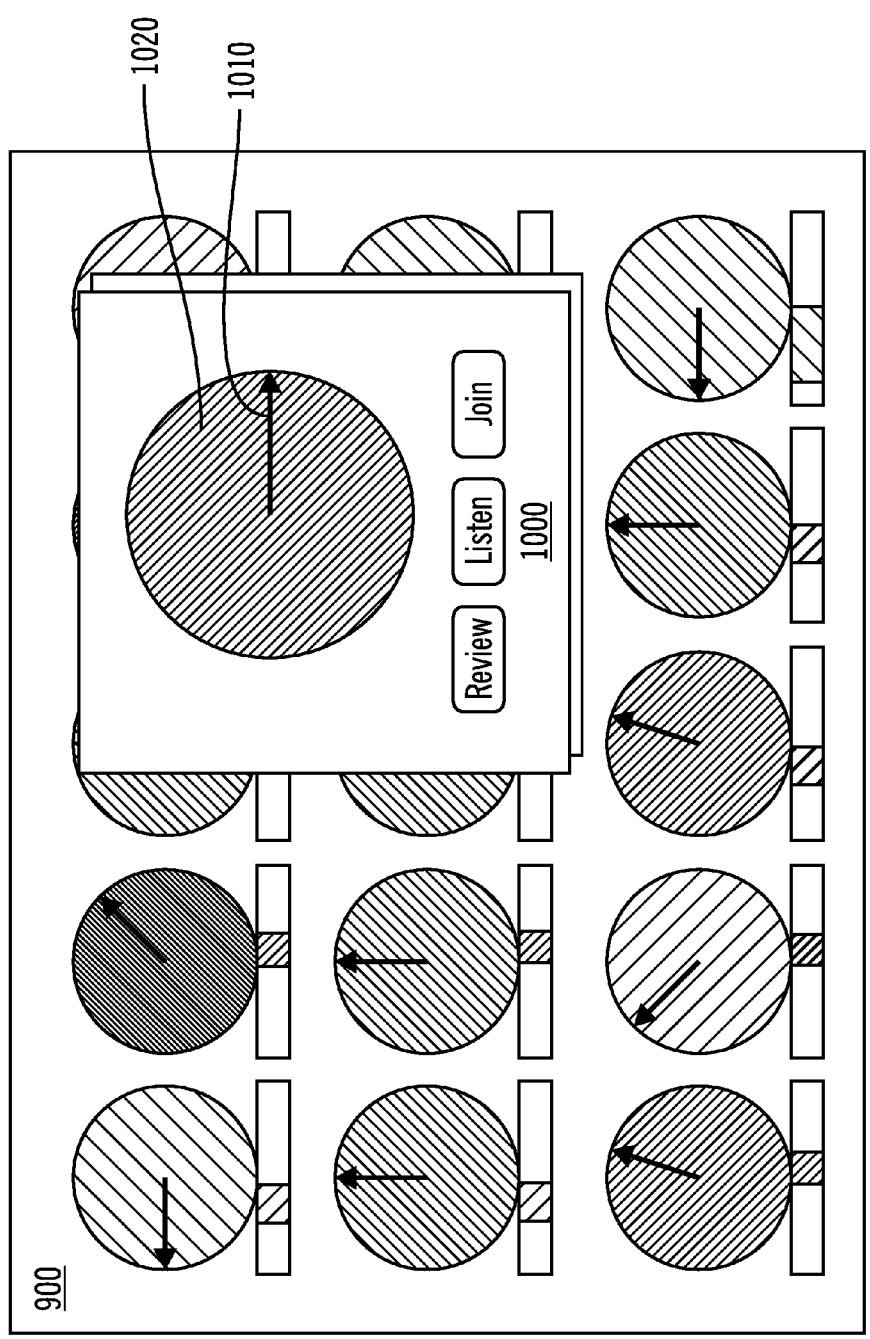
FIG. 10 illustrates details of a particular circular gauge in accordance with certain embodiments.

When a dashboard user selects (e.g., touches with a finger or with an input device (e.g., a mouse)) a particular circular gauge, the dashboard engine 112 displays details of the selected circular gauge. FIG. 10 illustrates details of a particular circular gauge 1000 in accordance with certain embodiments. The circular gauge 1000 includes needle 1010 and pattern 1020 representing the cumulative sentiment score. The details may include displaying a value representing the instantaneous sentiment score and/or the cumulative sentiment score (e.g., the value of "10" in circular gauge 1000). The details also include providing "Review", "Listen", and "Join" buttons. Selection of the "Review" button allows a dashboard user to review the communication in its entirety with indication of critical chunks of text (e.g., extreme portions of negative sentiment where a customer might be extremely angry, dissatisfied, etc.) and their associated sentiment. Selection of the "Listen" button allows a dashboard user to listen to all or portions of the communication (e.g., associated with a given level of sentiment detected on the gauges). Selection of the "Join" button allows a dashboard user to join the communication.

Figure 11:
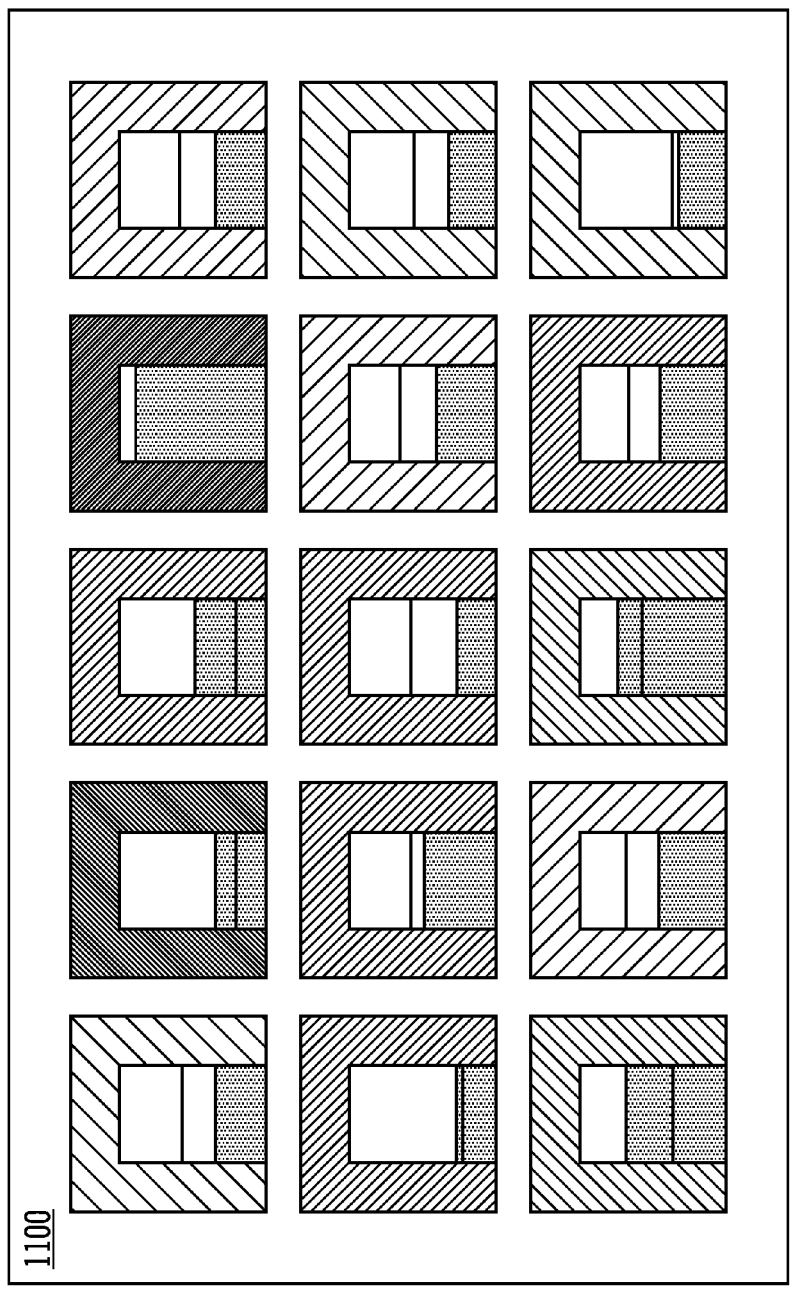
FIG. 11 illustrates an example equalizer dashboard in accordance with certain embodiments.

FIG. 11 illustrates an example equalizer dashboard in accordance with certain embodiments. In FIG. 11, each separate, equalizer represents a different communication (each between two or more users, such as a customer and a company representative). In FIG. 11, for each equalizer, a cumulative sentiment score is indicated by a dark line and a pattern of that equalizer. In FIG. 11, for each equalizer, the instantaneous (most recent sample) sentiment score is depicted by a bar graph within the equalizer. Using the equalizers, a good sense of the sentiment, as well as, the current trend may be determined.

Figure 12:
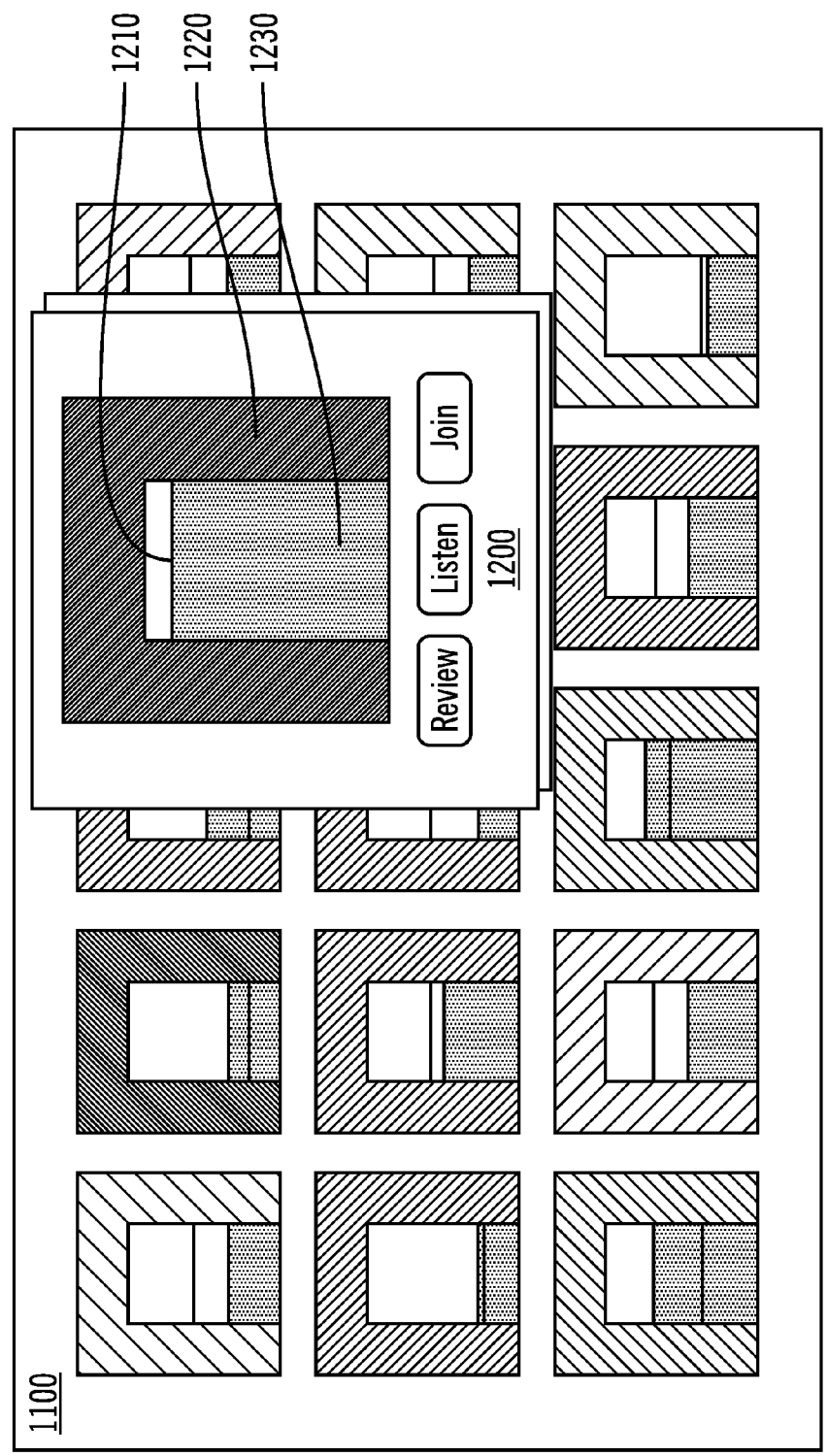
FIG. 12 illustrates details of a particular equalizer in accordance with certain embodiments.

When a dashboard user selects (e.g., touches with a finger or with an input device (e.g., a mouse)) a particular equalizer, the dashboard engine 112 displays details of the selected equalizer. FIG. 12 illustrates details of a particular equalizer 1200 in accordance with certain embodiments. The equalizer 1200 includes a dark line 1210 and pattern 1220 representing the cumulative sentiment score, as well as, a bar graph 1230 representing the instantaneous sentiment score. The details may include displaying a value representing the instantaneous sentiment score and/or the cumulative sentiment score. The details also include providing "Review", "Listen", and "Join" buttons. Selection of the "Review" button allows a dashboard user to review the communication in its entirety with indication of critical chunks of text (e.g., extreme portions of negative sentiment where a customer might be extremely angry, dissatisfied, etc.) and their associated sentiment. Selection of the "Listen" button allows a dashboard user to listen to all or portions of the communication (e.g., associated with a given level of sentiment detected on the gauges). Selection of the "Join" button allows a dashboard user to join the communication.

Figure 13:
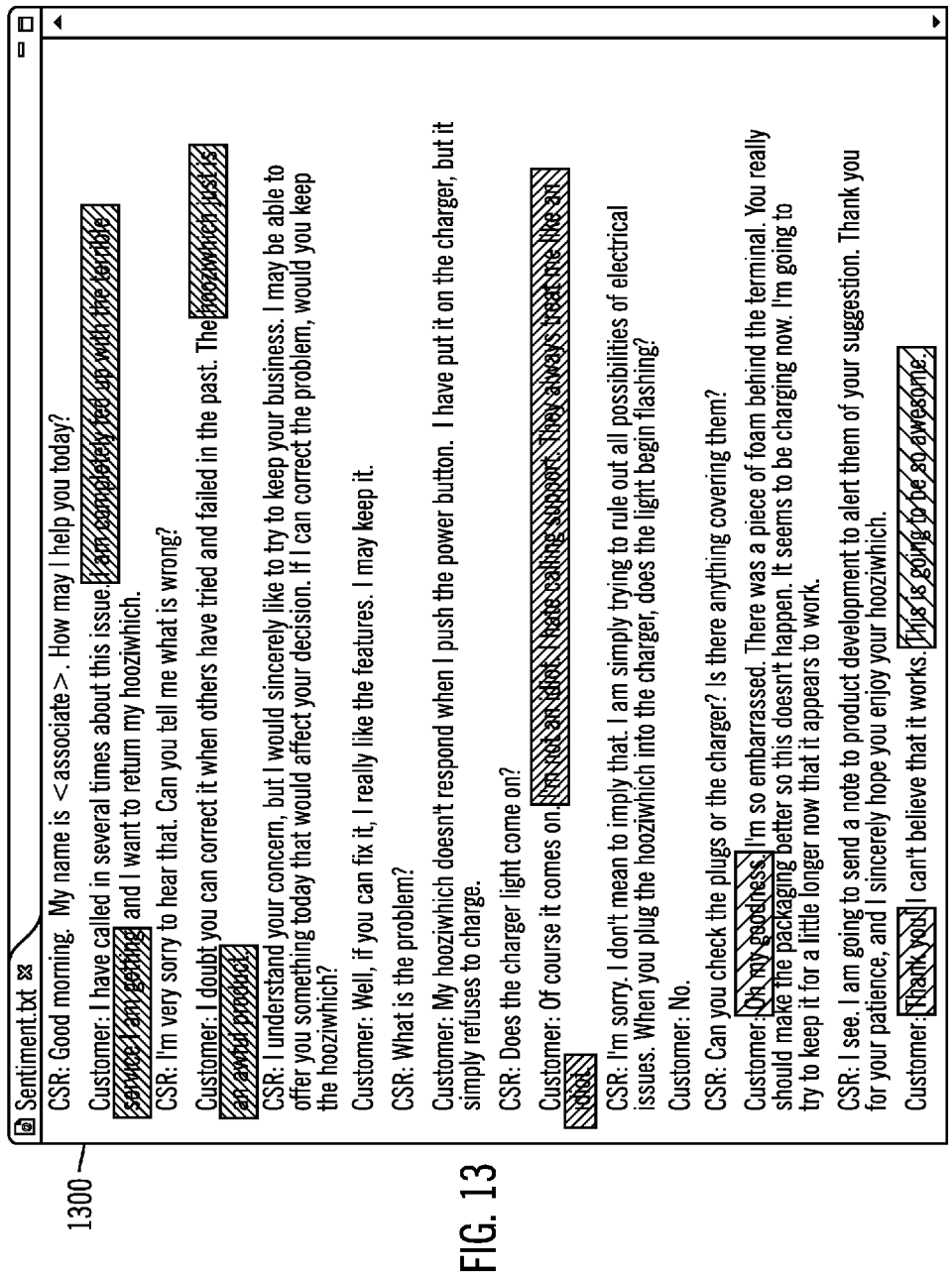
FIG. 13 illustrates an example report in accordance with certain embodiments.

FIG. 13 illustrates an example report 1300 in accordance with certain embodiments. The report 1300 is displayed in response to dashboard user selection of a "Review" button. The report 1300 includes the text form of a communication, with certain words being highlighted (e.g., shown in rectangles, shown in different colors, shown with different background patterns, etc.). In certain embodiments, sentiment phrases are highlighted, and the dashboard user may select a phrase to hear that portion of the call replayed.

Figure 14:
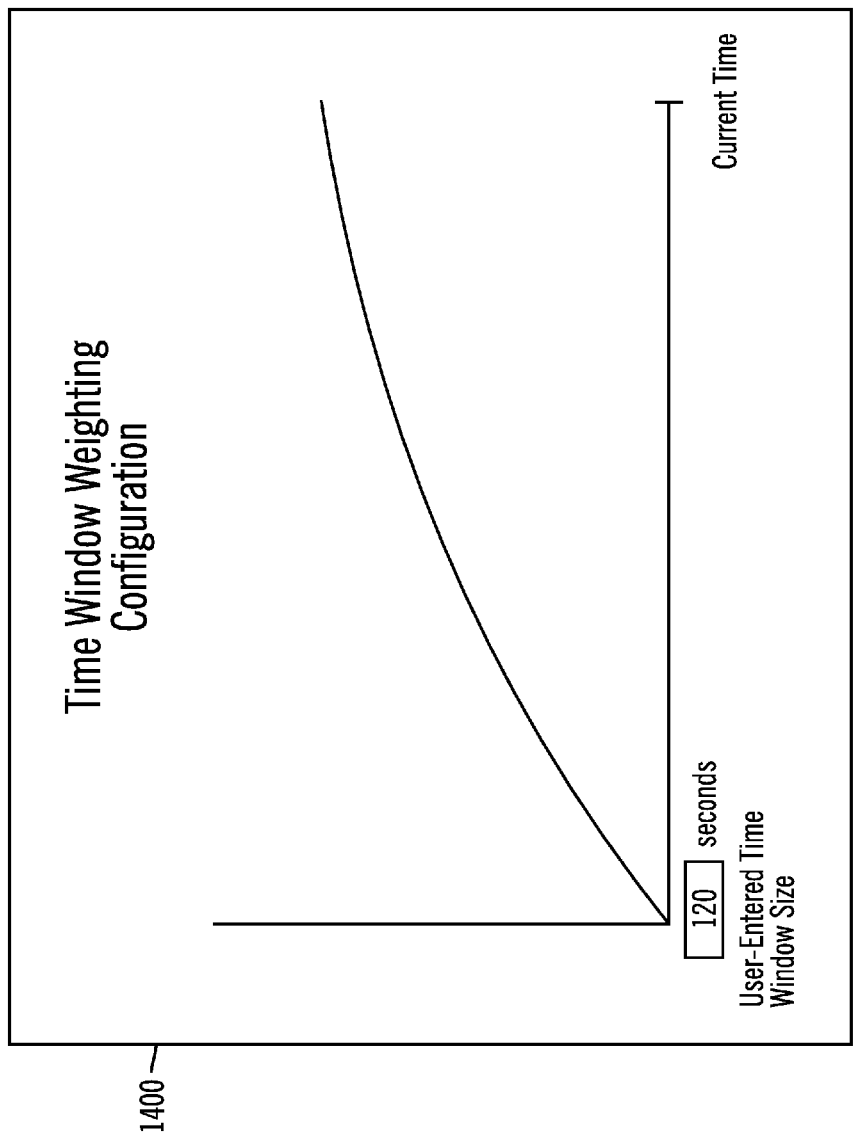
FIG. 14 illustrates an example representation 1400 of how a dashboard user may configure a time window and a weighting in accordance with certain embodiments.

The dashboard engine 112 also provides a configurable time window for the cumulative sentiment. With the dashboard engine 112, a dashboard user may track the sentiment of a communication from the beginning of that communication. However, the manger may also input a setting to monitor the last 1-2 minutes of the communication in the gauge. This prevents initial cordiality from influencing the results once the window of time has passed. Similarly, if things were going poorly, but have improved since that point, the gauge will accurately reflect the current sentiment. In addition, it is possible within the time window to more heavily weight the most recent items using the dashboard. FIG. 14 illustrates an example representation 1400 of how a dashboard user may configure a time window and a weighting in accordance with certain embodiments.

In certain embodiments, the dashboard user enters the amount of time that the dashboard engine 112 is to monitor in the cumulative score gauges and draw a curve or otherwise indicate intervals and weight values. This is an example of a possible way to allow a dashboard user to configure time-based weights for the sentiment scores coming in. So, if the customer was angry initially, but the company representative did a good job getting the situation under control, the gauge would fall back down to "good" more rapidly than without time-based weights. Likewise, if things were going well, but the customer started getting irritated, the gauge would spike more quickly. Both of these examples would assume a more-recent-heavy weighting.

Certain embodiments limit the conversation under analysis to the last 1-2 minutes, assuming an equal weight to all sentiments over that timeframe. The ability to change time-based weights would just add to that the ability to more heavily weight the last 30 seconds, but still have influence of the one minute and 30 seconds before that.

Also, another application would be to leave the analysis at the full conversation setting and just use the curve to achieve a similar result as looking at the last 1-2 minutes. Rather than weighting anything prior to the last 1-2 minutes as 0 influence, this would allow some influence to be maintained.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 15:
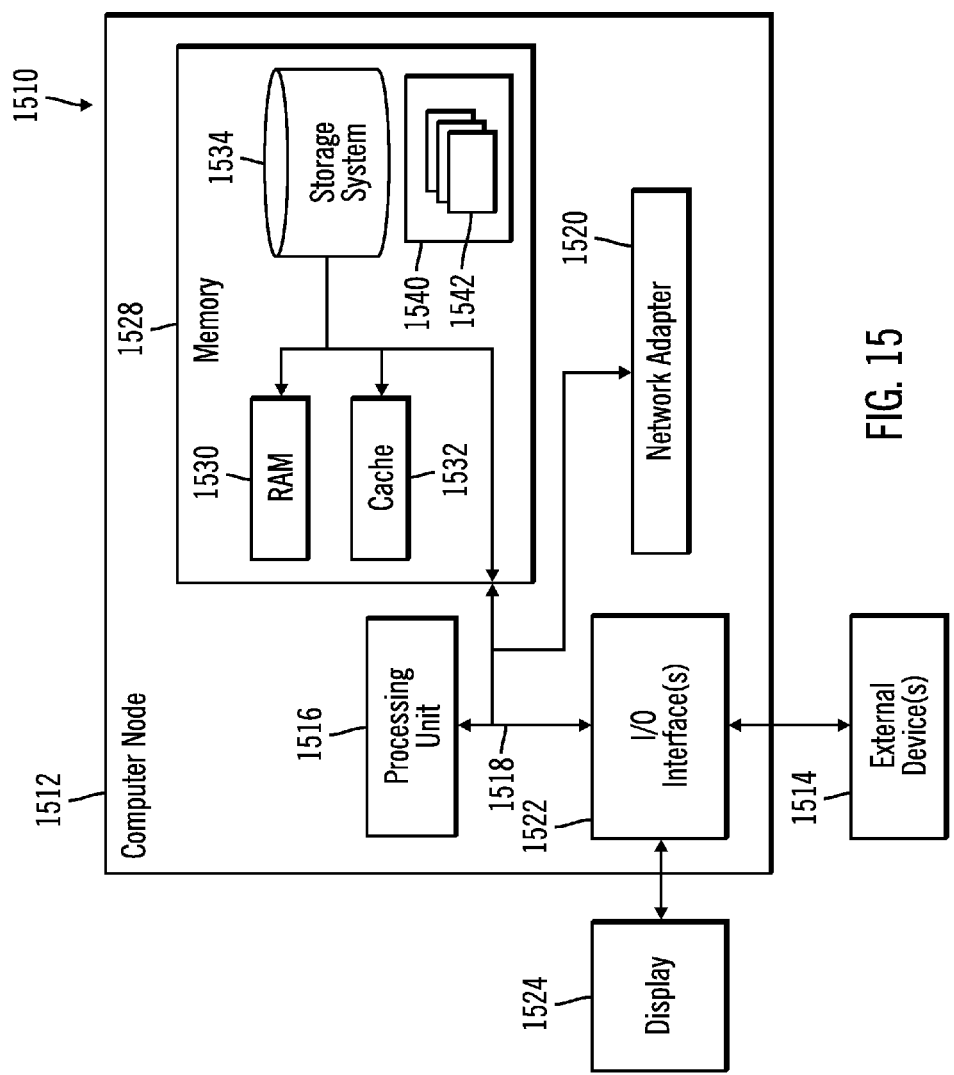
FIG. 15 illustrates a cloud computing node in accordance with certain embodiments.

Referring now to FIG. 15, a schematic of an example of a cloud computing node is shown. Cloud computing node 1510 is only one example of a suitable cloud computing node and is not intended to suggest any limitation as to the scope of use or functionality of embodiments of the invention described herein. Regardless, cloud computing node 1510 is capable of being implemented and/or performing any of the functionality set forth hereinabove.

In cloud computing node 1510 there is a computer system/server 1512, which is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communication 1520s network. In a distributed cloud computing environment, program modules may be located in both local and remote computer system storage media including memory storage devices.

As shown in FIG. 15, computer system/server 1512 in cloud computing node 1510 is shown in the form of a general-purpose computing device. The components of computer system/server 1512 may include, but are not limited to, one or more processors or processing units 1516, a system memory 1528, and a bus 1518 that couples various system components including system memory 1528 to a processor or processing unit 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1512 typically includes a variety of computer system readable media. Such media may be any available media that is accessible by computer system/server 1512, and it includes both volatile and non-volatile media, removable and non-removable media.

System memory 1528 can include computer system readable media in the form of volatile memory, such as random access memory (RAM) 1530 and/or cache memory 1532. Computer system/server 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication 1520 can occur via Input/Output (I/O) interfaces 1522. Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Figure 16:
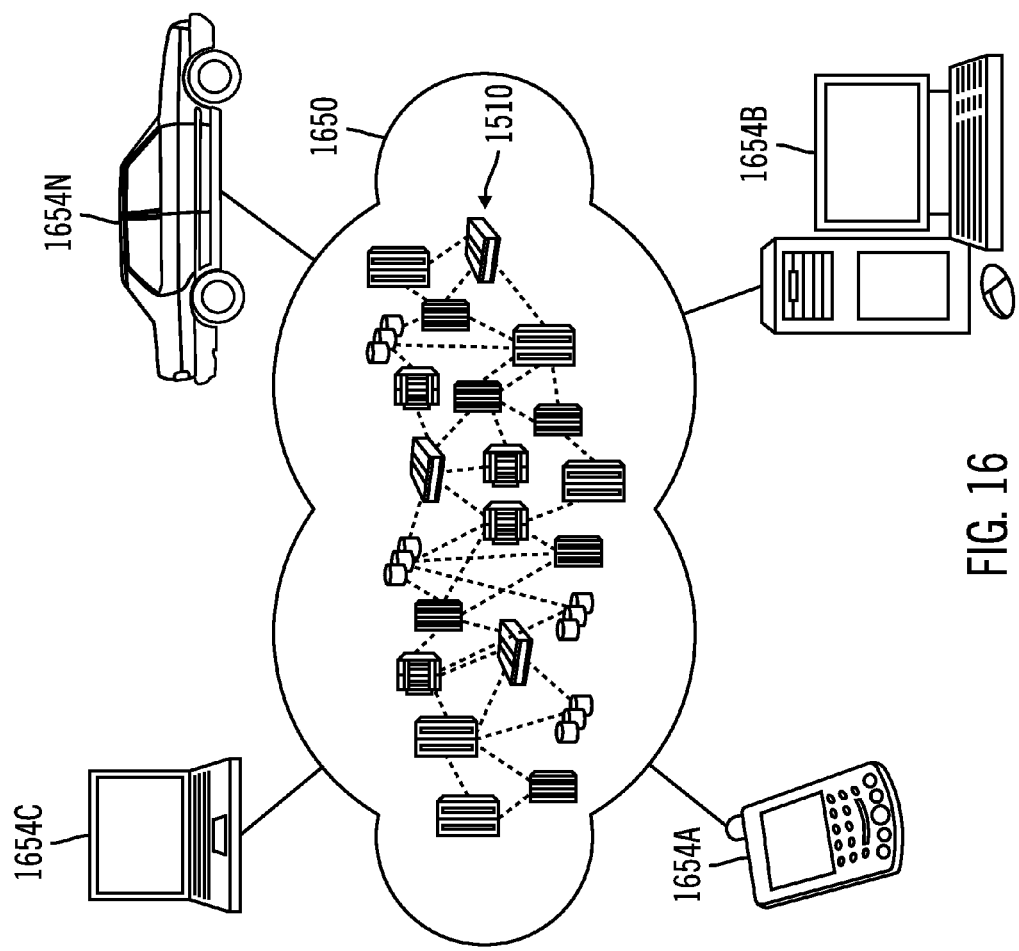
FIG. 16 illustrates a cloud computing environment in accordance with certain embodiments.

Referring now to FIG. 16, illustrative cloud computing environment 1650 is depicted. As shown, cloud computing environment 1650 comprises one or more cloud computing nodes 1510 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1510 and cloud computing environment 1650 can communicate with any type of computerized device over any type of network and/or network addressable connection (e.g., using a web browser).

Figure 17:
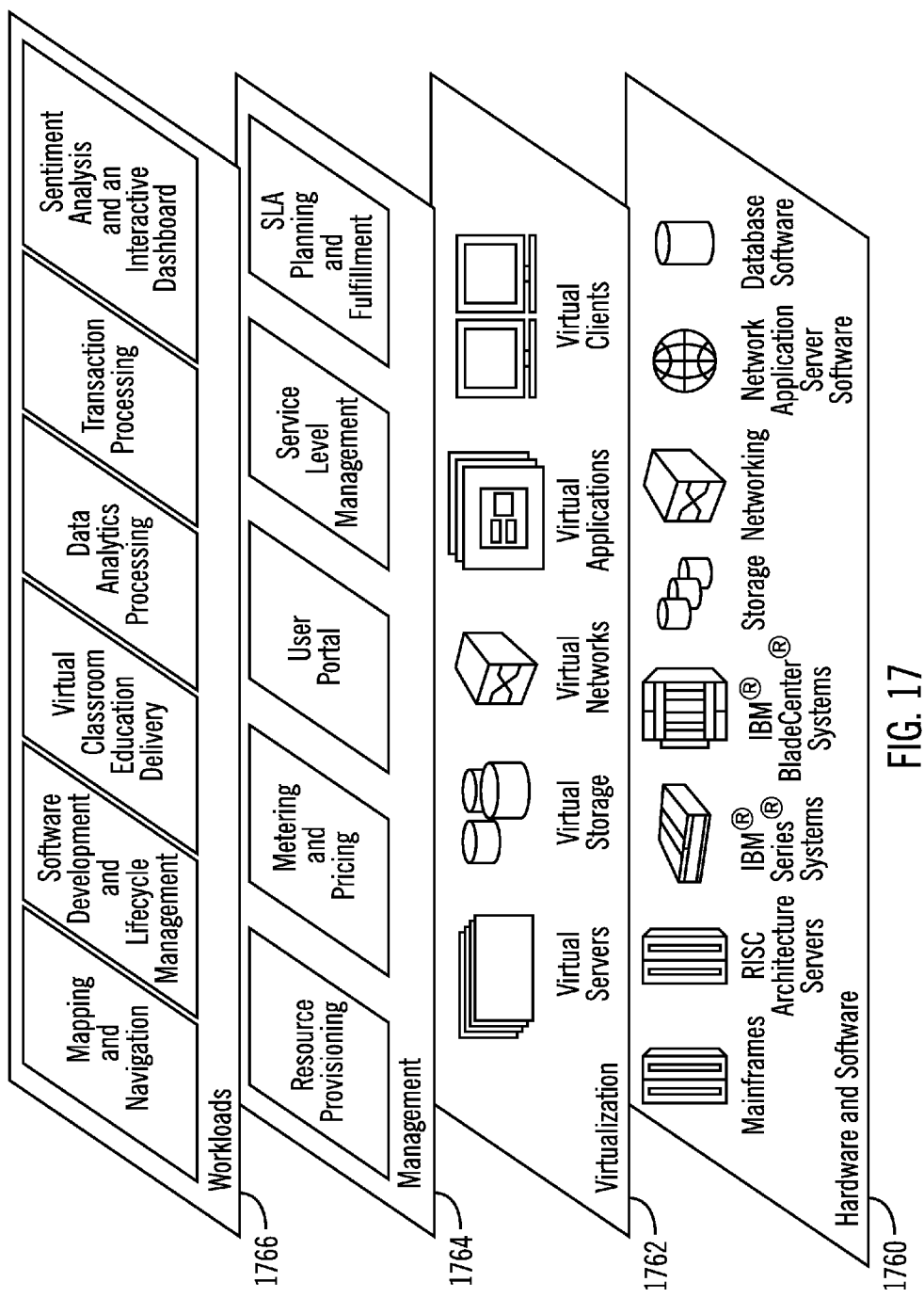
FIG. 17 illustrates abstraction model layers in accordance with certain embodiments.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1762 provides an abstraction layer from which the following examples of virtual entities may be provided: virtual servers; virtual storage; virtual networks, including virtual private networks; virtual applications and operating systems; and virtual clients.

In one example, management layer 1764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sentiment analysis and an interactive dashboard.

Thus, in certain embodiments, software or a program, implementing sentiment analysis and an interactive dashboard in accordance with embodiments described herein, is provided as a service in a cloud environment.

In certain embodiments, the computing device 100 has the architecture of computing node 1510. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

We claim:

1. A method, comprising:
   in real time, using a processor of a computer, while monitoring separate communications between pairs of users, wherein each of the pairs of users has a first user and a second user, generating a cumulative sentiment score representing a sentiment of the first user from each of the pairs of users during a period of time and an instantaneous sentiment score representing a sentiment of the first user from each of the pairs of users at a current time;
   displaying, in real time, an interactive dashboard with a visual representation for each of the pairs of users having a circular gauge representing the cumulative sentiment score and a bar graph representing the instantaneous sentiment score;
   in response to selection of one of the circular gauges by a manager, displaying options to enable reviewing a communication, listening to an on-going communication, and joining the on-going communication; and
   in response to selection of one of the options, enabling that option for the manager for the communications between the pair of users associated with the selected circular gauge.

2. The method of claim 1, wherein the cumulative sentiment score represents a different sentiment than the instantaneous sentiment score.

3. The method of claim 1, further comprising:
   generating a cumulative sentiment score representing a sentiment of the second user from each of the pairs of users during a period of time and an instantaneous sentiment score representing a sentiment of the second user from each of the pairs of users at a current time; and
   displaying the interactive dashboard with a visual representation for each of the pairs of users having a circular gauge representing the cumulative sentiment score of the second user and a bar graph representing the instantaneous sentiment score of the second user.

4. The method of claim 1, further comprising:
in response to receiving selection for reviewing the communication, displaying a report in which particular phrases representing the sentiment are highlighted.

5. The method of claim 1, wherein the circular gauge includes a needle and a background pattern indicating the cumulative sentiment score.

6. The method of claim 1, further comprising:
displaying the interactive dashboard with a new visual representation of an equalizer for each of the pairs of users having a circular gauge with a line and a background pattern indicating the cumulative sentiment score and a bar graph indicating the instantaneous sentiment score.

7. The method of claim 1, wherein a Software as a Service (SaaS) is provided to perform the method.

8. A computer program product, the computer program product comprising:
a non-transitory computer readable storage medium having computer readable program code embodied therewith, the computer readable program code, executable by at least one processor of a computer, is configured to perform:
in real time, while monitoring separate communications between pairs of users, wherein each of the pairs of users has a first user and a second user, generating a cumulative sentiment score representing a sentiment of the first user from each of the pairs of users during a period of time and an instantaneous sentiment score representing a sentiment of the first user from each of the pairs of users at a current time;
displaying, in real time, an interactive dashboard with a visual representation for each of the pairs of users having a circular gauge representing the cumulative sentiment score and a bar graph representing the instantaneous sentiment score;
in response to selection of one of the circular gauges by a manager, displaying options to enable reviewing a communication, listening to an on-going communication, and joining the on-going communication; and
in response to selection of one of the options, enabling that option for the manager for the communications between the pair of users associated with the selected circular gauge.

9. The computer program product of claim 8, wherein the cumulative sentiment score represents a different sentiment than the instantaneous sentiment score.

10. The computer program product of claim 8, wherein the computer readable program code, executable by the at least one processor of the computer, is configured to perform:
generating a cumulative sentiment score representing a sentiment of the second user from each of the pairs of users during a period of time and an instantaneous sentiment score representing a sentiment of the second user from each of the pairs of users at a current time; and
displaying the interactive dashboard with a visual representation for each of the pairs of users having a circular gauge representing the cumulative sentiment score of the second user and a bar graph representing the instantaneous sentiment score of the second user.

11. The computer program product of claim 8, wherein computer readable program code, executable by the at least one processor of the computer, is configured to perform:
in response to receiving selection for reviewing the communication, displaying a report in which particular phrases representing the sentiment are highlighted.

12. The computer program product of claim 8, wherein a Software as a Service (SaaS) is configured to perform the computer program product operations.

13. The computer program product of claim 8, wherein the computer readable program code, executable by the at least one processor of the computer, is configured to perform:
displaying the interactive dashboard with a new visual representation of an equalizer for each of the pairs of users having a circular gauge with a line and a background pattern indicating the cumulative sentiment score and a bar graph indicating the instantaneous sentiment score.

14. A computer system, comprising:
a processor; and
a storage device connected to the processor, wherein the storage device has stored thereon a program, wherein the processor is configured to execute instructions of the program to perform operations, and wherein the operations comprise:
in real time, while monitoring separate communications between pairs of users, wherein each of the pairs of users has a first user and a second user, generating a cumulative sentiment score representing a sentiment of the first user from each of the pairs of users during a period of time and an instantaneous sentiment score representing a sentiment of the first user from each of the pairs of users at a current time;
displaying, in real time, an interactive dashboard with a visual representation for each of the pairs of users having a circular gauge representing the cumulative sentiment score and a bar graph representing the instantaneous sentiment score;
in response to selection of one of the circular gauges by a manager, displaying options to enable reviewing a communication, listening to an on-going communication, and joining the on-going communication; and
in response to selection of one of the options, enabling that option for the manager for the communications between the pair of users associated with the selected circular gauge.

15. The computer system of claim 14, wherein the cumulative sentiment score represents a different sentiment than the instantaneous sentiment score.

16. The computer system of claim 14, wherein the operations further comprise:
generating a cumulative sentiment score representing a sentiment of the second user from each of the pairs of users during a period of time and an instantaneous sentiment score representing a sentiment of the second user from each of the pairs of users at a current time; and
displaying the interactive dashboard with a visual representation for each of the pairs of users having a circular gauge representing the cumulative sentiment score of the second user and a bar graph representing the instantaneous sentiment score of the second user.

17. The computer system of claim 14, wherein the operations further comprise:
in response to receiving selection for reviewing the communication, displaying a report in which particular phrases representing the sentiment are highlighted.

18. The computer system of claim 14, wherein a Software as a Service (SaaS) is provided to perform the system operations.

19. The computer system of claim 14, wherein the operations further comprise:
displaying the interactive dashboard with a new visual representation of an equalizer for each of the pairs of users having a circular gauge with a line and a background pattern indicating the cumulative sentiment score and a bar graph indicating the instantaneous sentiment score.

* * * * *